US010222485B2

(12) United States Patent
Kakiuchi et al.

(10) Patent No.: US 10,222,485 B2
(45) Date of Patent: Mar. 5, 2019

(54) VEHICLE GATE MONITOR

(71) Applicant: MITSUBISHI ELECTRIC PLANT ENGINEERING CORPORATION, Tokyo (JP)

(72) Inventors: Hideaki Kakiuchi, Tokyo (JP); Keiichi Matsuo, Tokyo (JP); Yohei Sakanashi, Tokyo (JP); Taizo Harada, Tokyo (JP)

(73) Assignee: MITSUBISHI ELECTRIC PLANT ENGINEERING CORPORATION, Taitou-ku, Tokyo (JP)

( * ) Notice: Subject to any disclaimer, the term of this patent is extended or adjusted under 35 U.S.C. 154(b) by 0 days.

(21) Appl. No.: 15/562,998

(22) PCT Filed: Mar. 22, 2016

(86) PCT No.: PCT/JP2016/059023
§ 371 (c)(1),
(2) Date: Sep. 29, 2017

(87) PCT Pub. No.: WO2016/158573
PCT Pub. Date: Oct. 6, 2016

(65) Prior Publication Data
US 2018/0364368 A1 Dec. 20, 2018

(30) Foreign Application Priority Data

Mar. 31, 2015 (JP) ................. 2015-071765

(51) Int. Cl.
*G01T 1/169* (2006.01)
*G06K 7/10* (2006.01)
*G07C 5/00* (2006.01)

(52) U.S. Cl.
CPC .......... *G01T 1/169* (2013.01); *G06K 7/10366* (2013.01); *G07C 5/006* (2013.01)

(58) Field of Classification Search
CPC ..... G01T 1/169; G06K 7/10366; G07C 5/006
See application file for complete search history.

(56) References Cited

U.S. PATENT DOCUMENTS

2009/0321650 A1    12/2009   Kadner et al.

FOREIGN PATENT DOCUMENTS

JP    2014-006083 A    1/2014
JP    2014-010002 A    1/2014
(Continued)

OTHER PUBLICATIONS

International Search Report of PCT/JP2016/059023 dated Apr. 26, 2016.

*Primary Examiner* — David P Porta
*Assistant Examiner* — Faye Boosalis
(74) *Attorney, Agent, or Firm* — Sughrue Mion, PLLC; Richard C. Turner

(57) ABSTRACT

Provided is a vehicle gate monitor including a gate on which a detector group is mounted, the detector group including: a first detector, which is arranged in a manner that allows vertical and horizontal movement, and is configured to measure radiation levels of both side surfaces of the vehicle; a second detector, which is arranged in a manner that allows vertical, rotational, and horizontal movement, and is configured to measure radiation levels of a front surface, a rear surface, an upper surface, and a cargo bed surface of the vehicle; and a third detector, which is arranged in a manner that allows vertical and horizontal movement, and is configured to measure a radiation level of an inner-side side surface of the cargo bed, the gate including a control unit configured to identify, while moving the gate with respect to a stationary vehicle, presence/absence of a contaminated place.

7 Claims, 7 Drawing Sheets

(56) References Cited

FOREIGN PATENT DOCUMENTS

| | | |
|---|---|---|
| JP | 2014-062744 A | 4/2014 |
| JP | 2014-089052 A | 5/2014 |

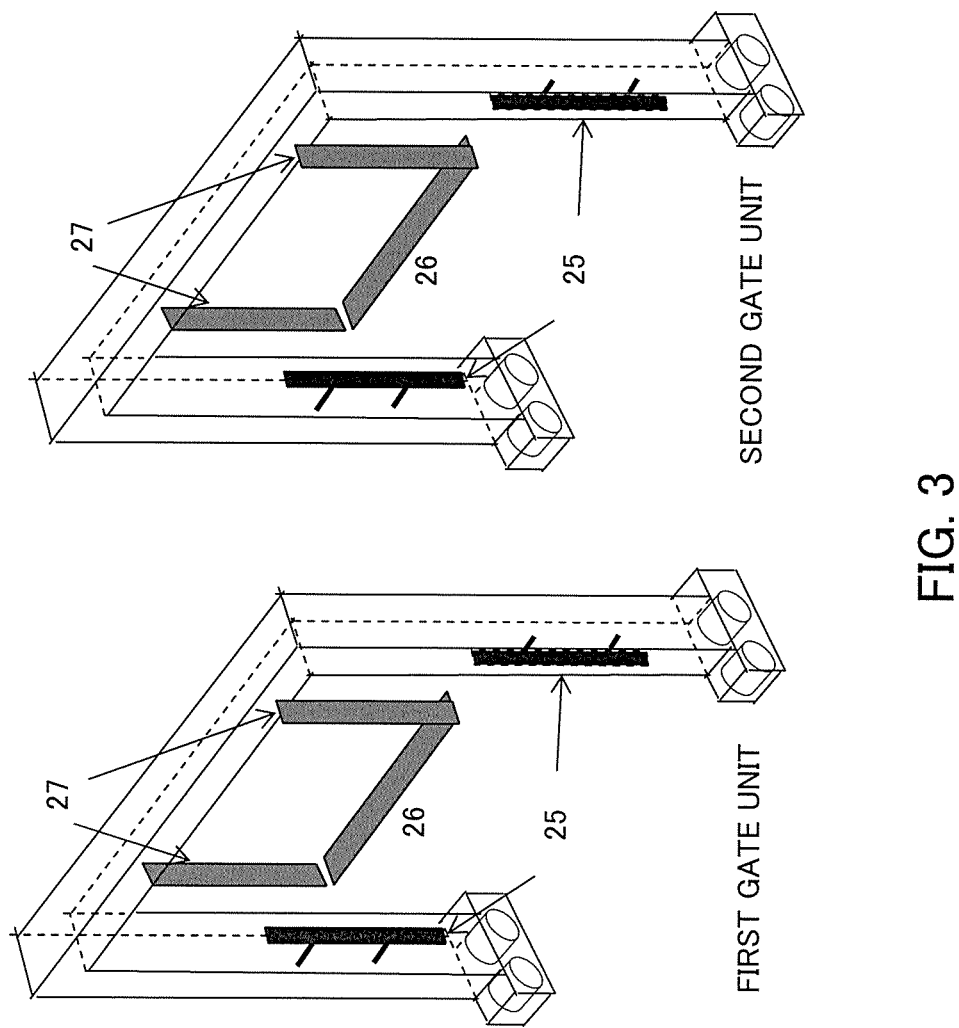

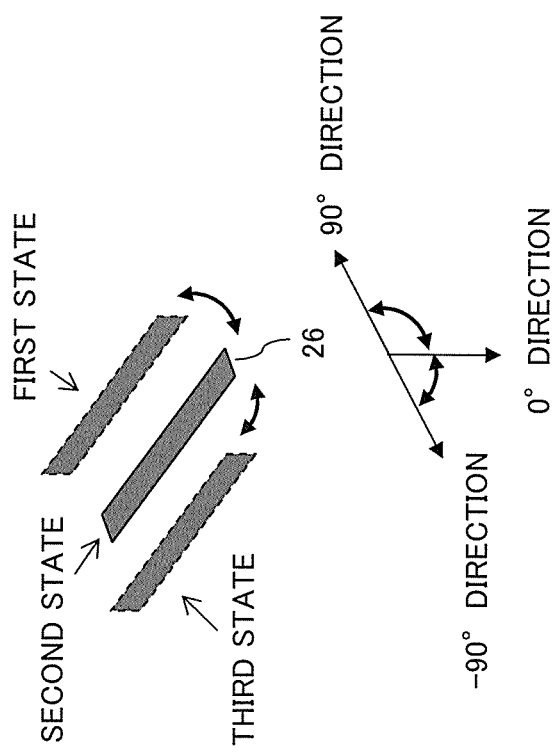

| GATE | DETECTOR | STATE | MEASUREMENT REGION |
|---|---|---|---|
| FIRST GATE UNIT 20(1) | FIRST DETECTOR 25 | — — — | BODY SIDE SURFACE |
| | SECOND DETECTOR 26 | FIRST STATE | BODY FRONT SURFACE |
| | | SECOND STATE | DRIVER SEAT ROOF SURFACE, CARGO BED BOTTOM SURFACE |
| | | THIRD STATE | SURFACE BEHIND DRIVER SEAT |
| | THIRD DETECTOR 27 | — — — | CARGO BED INNER-SIDE SIDE SURFACE |
| SECOND GATE UNIT 20(2) | FIRST DETECTOR 25 | — — — | BODY SIDE SURFACE |
| | SECOND DETECTOR 26 | FIRST STATE | CARGO BED INNER-SIDE REAR SURFACE |
| | | SECOND STATE | CARGO BED BOTTOM SURFACE |
| | | THIRD STATE | BODY REAR SURFACE |
| | THIRD DETECTOR 27 | — — — | CARGO BED INNER-SIDE SIDE SURFACE |

FIG. 5

VEHICLE GATE MONITOR

CROSS REFERENCE TO RELATED APPLICATIONS

This application is a National Stage of International Application No. PCT/JP2016/059023 filed Mar. 22, 2016, claiming priority based on Japanese Patent Application No. 2015-071765 filed Mar. 31, 2015, the contents of all of which are incorporated herein by reference in their entirety.

TECHNICAL FIELD

The present invention relates to a vehicle gate monitor configured to monitor, for a vehicle transporting a radioactive material, a contamination state of the radioactive material on the vehicle surfaces.

BACKGROUND ART

For a vehicle performing transportation work on the premises of a facility handling a radioactive material, the radioactive material may adhere to the vehicle surfaces. Therefore, in order to prevent the radioactive material from spreading out of a given predetermined zone, there is a need for an apparatus capable of inspecting vehicles that have finished work in the zone and are to leave the zone for the presence/absence of a contamination state (radioactive contamination) of the radioactive material.

There is related art in which the presence/absence of radioactive contamination on a vehicle, which is the inspection target, is judged (e.g., refer to Patent Literature 1). In Patent Literature 1, under a state in which a mobile unit is stationary, the presence/absence of contamination is detected by an upper surface detection unit, a right-side surface detection unit, and a left-side surface detection unit in the mobile unit. The presence/absence of contamination on the three surfaces, namely, the upper surface, the right-side surface, and the left-side surface, is detected by moving the mobile unit and repeating detection at the remaining places.

In Patent Literature 1, the presence/absence of contamination on the front surface and the rear surface of the vehicle is detected by a front surface detection unit and a rear surface detection unit, which respectively are arranged as separate components to the mobile unit. As a result, detection for the presence/absence of contamination is performed for all of the surfaces of the vehicle to be inspected, and when contamination is not detected on any of the front surface, the rear surface, the right-side surface, the left-side surface, and the upper surface, such a vehicle is judged as having no contamination.

CITATION LIST

Patent Literature

[PTL 1] JP 2014-10002 A

SUMMARY OF INVENTION

Technical Problem

However, the related art suffers from the following problems.

The related-art apparatus disclosed in Patent Literature 1 is capable of detecting the presence/absence of contamination on all of the following surfaces: the front surface, the rear surface, the right-side surface, the left-side surface, and the upper surface. However, the detection for the presence/absence of contamination on three surfaces of the vehicle, namely, the upper surface, the right-side surface, and the left-side surface, is performed while repeatedly moving and stopping the mobile unit, and it requires about 15 seconds to perform one inspection in a stationary state. In particular, for storage of radioactive materials and decommissioning work in which large amounts of radioactive materials or potentially contaminated materials are handled, transportation is performed by using many vehicles. As a result, with the related-art apparatus, the inspection takes time to perform, and there may be a traffic jam of the vehicles at the inspection site. Therefore, there is a need for an apparatus capable of inspecting a contamination state of the vehicles due to radioactivity faster and more accurately.

The present invention has been made in order to solve the problems described above, and has an objective to obtain a vehicle gate monitor capable of monitoring a contamination state of a radioactive material on vehicle surfaces faster and more accurately than the related-art apparatus.

Solution to Problem

According to one embodiment of the present invention, there is provided a vehicle gate monitor including a gate unit, the gate unit including: a gate including a pair of vertical beams and a horizontal beam for connecting upper end portions of the pair of vertical beams; a detector group, which is arranged on the gate, and is configured to quantitatively measure a contamination state of a vehicle to be measured; and a control unit configured to detect, by causing the gate to move with respect to the vehicle, which is stationary, radiation levels of a front surface, a rear surface, both side surfaces, an upper surface, and a cargo bed surface of the vehicle via the detector group to identify a contaminated place based on a detection result, the detector group including: a pair of first detectors, which is arranged on the pair of vertical beams, and is configured to measure the radiation levels of both the side surfaces of the vehicle as a surface to be measured; a pair of third detectors, which is mounted on the horizontal beam in a manner that allows the pair of third detectors to vertically and horizontally move in accordance with a cargo bed shape of the vehicle, and is configured to measure a radiation level of an inner-side side surface of the cargo bed surface of the vehicle as the surface to be measured; and a second detector, which is mounted on the horizontal beam in a manner that allows the second detector to vertically and horizontally move together with the pair of third detectors and to rotatably move so as to face the surface to be measured, and is configured to measure the radiation levels of the front surface, the rear surface, the upper surface, and a surface of the cargo bed surface other than the inner-side side surface of the vehicle as the surface to be measured, the vehicle gate monitor further including a distance sensor to be mounted on the gate, the distance sensor being configured to measure a distance from the surface to be measured of the vehicle so that the detector group is capable of maintaining a position that is separated by a predetermined distance from the surface to be measured, the control unit being configured to: acquire, from outside, movement path data defined based on known dimension data for identifying a position of the surface to be measured of the vehicle; and control a vertical position and a depth position of the pair of first detectors, a vertical position, a horizontal position, and a rotation position of the second detector, and a vertical position and a horizontal position of the pair of third detectors while moving the gate from the front surface of the vehicle toward the rear surface of the vehicle and correcting the movement path data in accordance with a measurement result obtained from the distance sensor, to thereby continuously move the pair of first detectors, the second detector, and the pair of third detectors while maintaining the position that is separated by a predetermined distance from the surface to be measured of the vehicle to identify a contaminated place based on a detection result obtained via the detector group.

Advantageous Effects of Invention

According to the present invention, there is provided an apparatus capable of quickly and accurately inspecting the radiation levels of the surfaces and the cargo bed of the vehicle while continuously moving the detector group. As a result, the vehicle gate monitor capable of monitoring a contamination state of a radioactive material on vehicle surfaces faster and more accurately than the related-art apparatus can be obtained.

BRIEF DESCRIPTION OF DRAWINGS

FIG. 3 is an explanatory diagram relating to a configuration of detectors to be mounted on gate units in the first embodiment of the present invention.

FIG. 4 is an explanatory diagram relating to a configuration of a second detector in the first embodiment of the present invention.

FIG. 5 is a table for showing measurement regions by first detectors, the second detector, and third detectors in the first embodiment of the present invention.

DESCRIPTION OF EMBODIMENTS

Referring to the accompanying drawings, a vehicle gate monitor according to a preferred embodiment of the present invention is specifically described below.

First Embodiment

Figure 1:
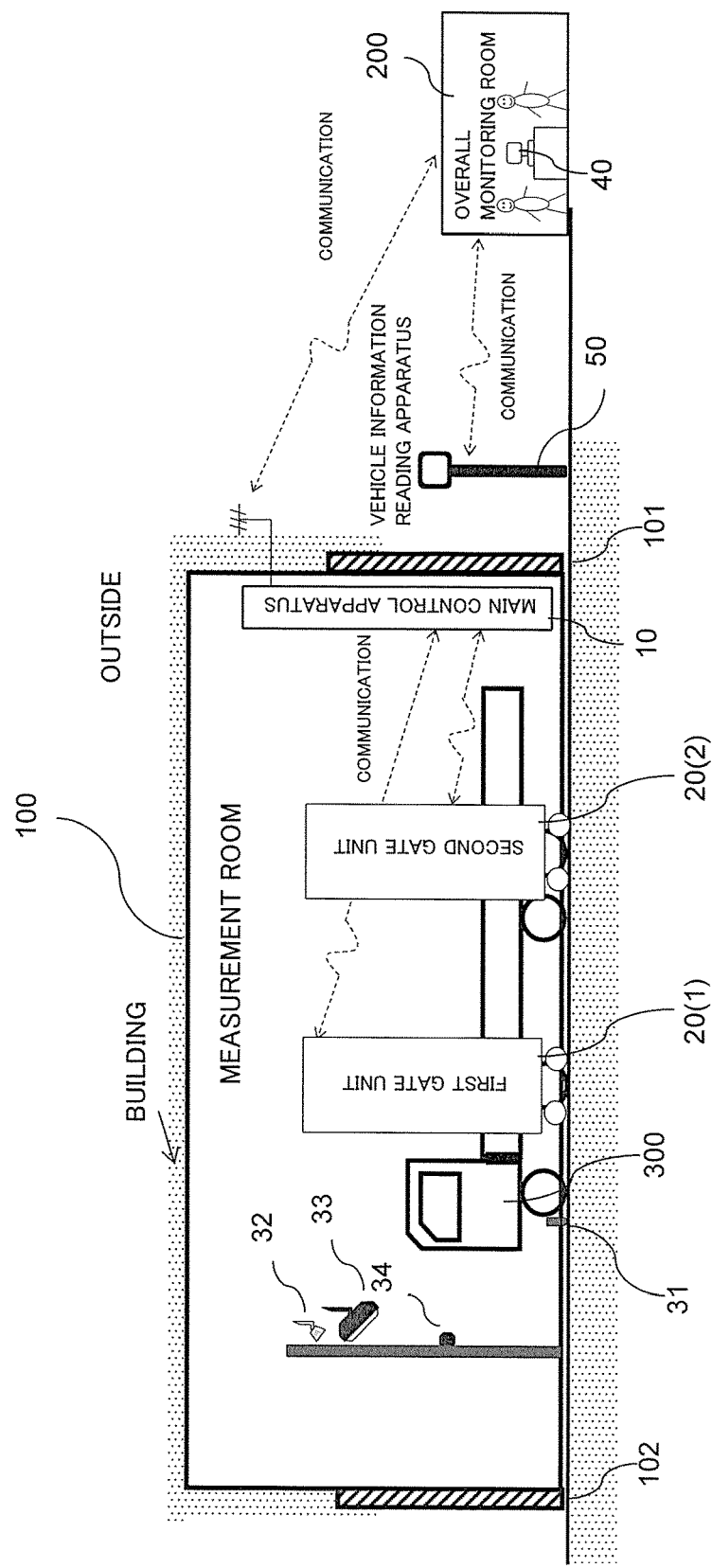
FIG. 1 is an overall configuration diagram for illustrating an outline of a vehicle gate monitor according to a first embodiment of the present invention.
Figure 2:
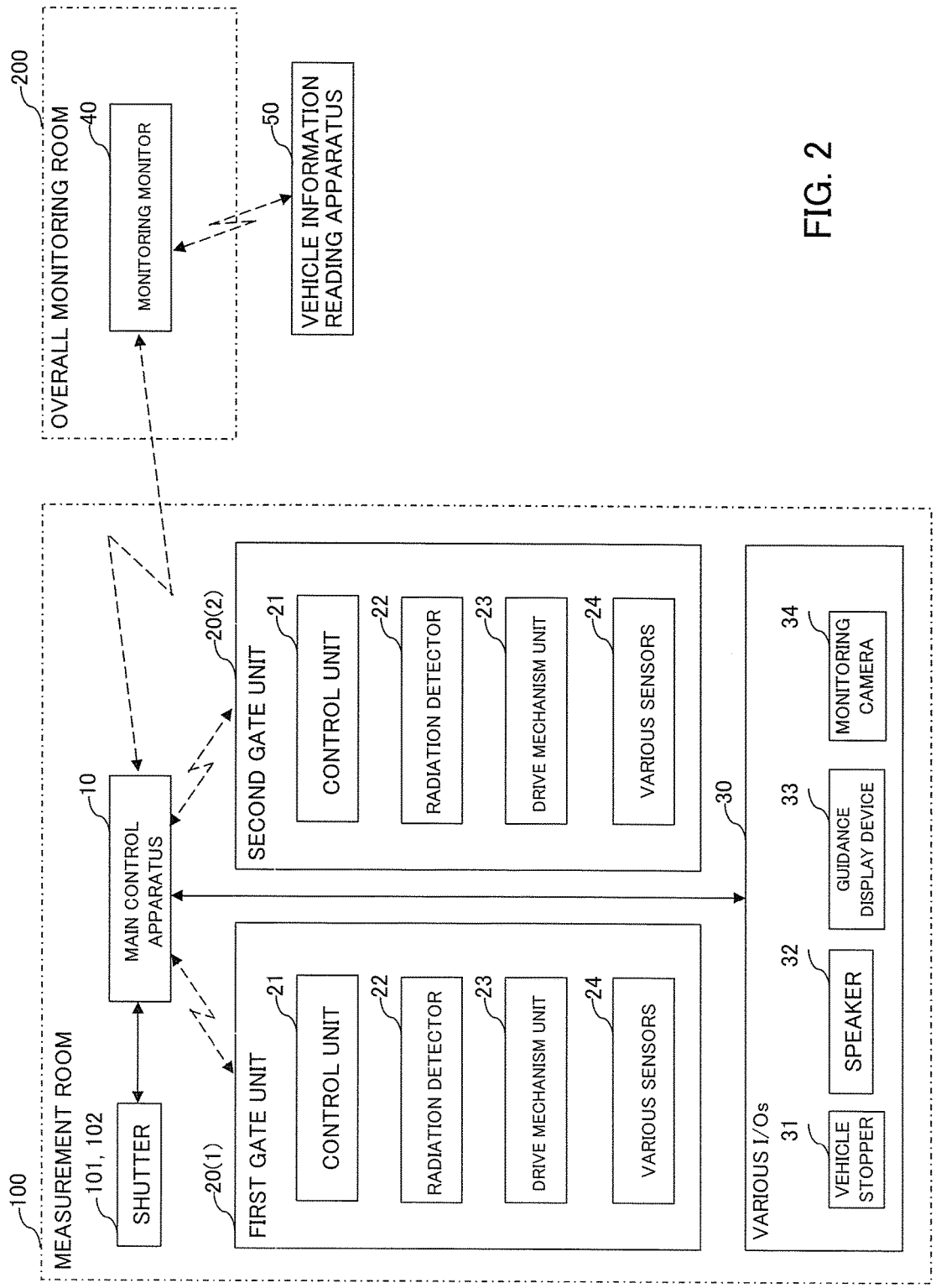
FIG. 2 is a function block diagram of the vehicle gate monitor according to the first embodiment of the present invention.

FIG. 1 is an overall configuration diagram for illustrating an outline of a vehicle gate monitor according to a first embodiment of the present invention. Further, FIG. 2 is a function block diagram of the vehicle gate monitor according to the first embodiment of the present invention. A configuration and a function of the vehicle gate monitor according to the first embodiment are now described with reference to FIG. 1 and FIG. 2.

A main control apparatus 10, a first gate unit 20(1), a second gate unit 20(2), and various I/Os 30 are arranged in a measurement room 100 in a facility. The various I/Os 30 include, for example, a vehicle stopper 31, a speaker 32, a guidance display device 33, and a monitoring camera 34. Shutters 101 and 102 configured to open and close when a vehicle 300 to be inspected enters or leaves are also arranged in the measurement room 100.

A monitoring monitor 40 is arranged in an overall monitoring room 200, which is provided at a separate location from the measurement room 100. The monitoring monitor 40 carries out an inspection by generating movement path data based on dimension data of the vehicle, and allows an operator to monitor the contamination state of the radioactive material, is arranged in the overall monitoring room 200. A vehicle information reading apparatus 50 for reading an identifier (ID) of a vehicle to be inspected from the current point is arranged at a position that is near a guide path to the measurement room 100 from the outside and that is in front of the shutter 101.

The main control apparatus 10 fulfils the role of a communication relay device configured to relay communication between the first and second gate units 20(1) and 20(2) and the monitoring monitor 40. Therefore, the monitoring monitor 40 is capable of communicating to and from the first gate unit 20(1) and the second gate unit 20(2) via the main control apparatus 10, and is capable of communicating directly to and from the vehicle information reading apparatus 50.

As illustrated in FIG. 2, the first gate unit 20(1) and the second gate unit 20(2) have the same configuration, and are each constructed from a control unit 21, a radiation detector 22, a drive mechanism unit 23, and various sensors 24. The function of each of the first gate unit 20(1) and the second gate unit 20(2) is described in more detail later.

Next, an outline of a series of steps performed when inspecting a contamination state of the radioactive material on the vehicle 300 is described with reference to FIG. 1 and FIG. 2.

(Step 1) Movement of Vehicle 300

First, the ID of the vehicle 300 to be inspected is read by the vehicle information reading apparatus 50, the vehicle 300 then passes the shutter 101, moves as far as the position of the vehicle stopper 31, and stops.

(Step 2) Inspection of Contamination State of Radioactive Material on Vehicle 300

The monitoring monitor 40 in the overall monitoring room 200 is configured to identify, based on a reading result obtained by the vehicle information reading apparatus 50, the position of surfaces to be measured on which radioactivity is to be detected, and by using the two gate units 20(1) and 20(2), to inspect the contamination state of the radioactive material on a front surface, a rear surface, a right-side surface, a left-side surface, and an upper surface of the vehicle, as well as a cargo bed (inner-side side surfaces and bottom surface of the cargo bed) and a surface behind the driver seat of the truck to be inspected.

(Step 3) Subsequent Processing in Accordance with Inspection Result

After inspection of the contamination state has been completed using the two gate units 20(1) and 20(2), the monitoring monitor 40 in the overall monitoring room 200 displays an inspection result, and removes the vehicle stopper 31 in order to permit the vehicle 300 to be inspected to move out of the zone when it is judged that the contamination state of all of the surfaces is OK based on the inspection result. As a result, the vehicle 300 passes the shutter 102 and leaves the measurement room 100.

On the other hand, when a contamination state is detected at even one place, the monitoring monitor 40 judges that a surface contamination state is not OK, issues a contamination notification and a notification urging decontamination from the speaker 32 and the guidance display device 33, and removes the vehicle stopper 31 in order to allow the vehicle 300 to be inspected to move out of the zone. As a result, the vehicle 300 passes the shutter 102 and leaves the measurement room 100.

Therefore, summarizing the above-mentioned steps 1 to 3, the monitoring monitor 40 is capable of guiding, stopping, and causing the vehicle 300 to be inspected to leave in the following manner by controlling the speaker 32 and the guidance display device 33, which are notification devices, and the vehicle stopper 31.

Before measurement of the contamination state, the monitoring monitor 40 raises the vehicle stopper, and guides the vehicle 300 to be inspected to an appropriate position and stop the vehicle 300 at that position by issuing an appropriate notification to the driver of the vehicle based on audio output from the speaker 32 and display output from the guidance display device 33.

After measurement of the contamination state, the monitoring monitor 40 lowers the vehicle stopper, and causes the vehicle 300 to be inspected to leave the measurement room 100 by issuing an appropriate notification to the driver of the vehicle based on audio output from the speaker 32 and display output from the guidance display device 33.

The vehicle gate monitor according to the present invention includes a plurality of inspection modes, for example, a mode for arbitrarily selecting a sensitivity and accuracy of surface contamination measurement by selecting an arbitrary inspection speed and a detector position at an arbitrary gap from the vehicle surface. The display content and the inspection mode are described in more detail later.

Next, features of the vehicle gate monitor according to the present invention are described. The technical features of the present invention can be summarized by the following two points.

(Feature 1) Faster inspection speed and better inspection accuracy as a result of using gate units.

(Feature 2) Improvement in apparatus performance as a result of special measures in the control method.

Each of those two features is now described in more detail below.

(Feature 1) Regarding Faster Inspection Speed and Better Inspection Accuracy as a Result of Using Gate Units FIG. 3 is an explanatory diagram relating to a configuration of a detector group to be mounted on the gate units 20 in the first embodiment of the present invention. The first gate unit 20(1) and the second gate unit 20(2) have the same configuration, and like parts are denoted by like reference numerals.

As illustrated in FIG. 3, the first gate unit 20(1) and the second gate unit 20(2) each include a pair of first detectors 25, a second detector 26, and a pair of third detectors 27. FIG. 4 is an explanatory diagram relating to a configuration of the second detector 26 in the first embodiment of the present invention. In FIG. 4, there is illustrated a state in which the second detector 26 pivots. However, as described later, the first detectors 25 and the third detectors 27 are also configured to pivot (not shown).

The pair of first detectors 25 are detectors for detecting the contamination state of the body side surfaces of the vehicle 300. As illustrated in FIG. 3, each of the pair of first detectors 25 is arranged on an inner side of a pair of vertical beams from which the gate units 20 are constructed. The pair of first detectors 25 is movable in order to optimize an inspection start position in accordance with a vehicle height of the vehicle 300. During inspection, the first detectors 25 are capable of moving while maintaining a fixed gap from the surface in accordance with the vehicle shape of the vehicle 300. For example, when the contamination state of a corner portion of a body side surface of the vehicle 300 is to be detected, detection can be performed by pivoting the detecting surface of each of the first detectors 25.

As illustrated in FIG. 4, for example, the second detector 26 is capable of freely changing position among a first state in which the detecting surface is facing in a 90° direction, a second state in which the detecting surface is facing in a 0° direction, and a third state in which the detecting surface is facing in a −90° direction. The second detector 26 is configured to detect the contamination state of the body front surface, the body rear surface, the driver seat roof surface, the surface behind the driver seat, and the cargo bed bottom surface, and the cargo bed rear surface of the vehicle 300.

The pair of third detectors 27 is detectors for detecting the contamination state of a cargo bed inner-side side surface of the vehicle 300. The pair of third detectors 27 is capable of moving together with the second detector 26 in a height direction in accordance with the shape of the vehicle 300. During inspection, the pair of third detectors 27 is capable of moving while maintaining a fixed gap from the surface in accordance with an inclination with respect to an advancement direction of the vehicle 300 and the vehicle shape of the vehicle 300. The third detector 27 is capable of freely changing position in accordance with the shape of the vehicle 300. For example, when the contamination state of a corner portion of a cargo bed inner side of the vehicle 300 is to be detected, detection can be performed by pivoting the detecting surface of each of the third detectors 27.

The second detector 26 and the pair of third detectors 27 are arranged on a horizontal beam disposed between upper end portions of a pair of vertical beams from which each gate unit 20 is constructed. This arrangement enables the above-mentioned change in position.

FIG. 5 is a table for showing measurement regions by the first detectors 25, the second detector 26, and the third detectors 27 in the first embodiment of the present invention. Specifically, there is shown in FIG. 5 a relation between each of the detectors and the measurement regions for a case in which, like in the layout illustrated in FIG. 1 described above, the first gate unit 20(1) handles the inspection of the front half of the body of the vehicle 300 and the second gate unit 20(2) handles the inspection of the rear half of the body of the vehicle 300.

In this way, the vehicle gate monitor according to the first embodiment is capable of continuously measuring the contamination state of the vehicle surfaces by simultaneously using the two gate units 20(1) and 20(2) to continuously move the detectors while adjusting the height and the direction of the detectors to a fixed gap in accordance with the shape of the vehicle. As a result, the measurement time of the contamination state of the vehicle surfaces can be substantially reduced, and the contamination state can be accurately measured with a fixed short side direction of the detectors at a fine pitch resolution. Therefore, the inspection can be performed faster and more accurately.

(Feature 2) Improvement in Apparatus Performance as Result of Special Measures in Control Method The vehicle gate monitor according to the first embodiment achieves, in addition to the increase in performance described in Feature 1, even faster speed and better performance due to a control method based on a drive mechanism and software processing. This is now described in detail below.

[1] Regarding Faster Speed Through Continuous Inspection

In this application, the vehicle 300 to be measured is limited. The dimension data of the vehicle 300 to be measured is associated with a vehicle ID, and stored in advance in a storage unit of the monitoring monitor 40. The vehicle to be measured may be limited to two kinds, for example, a 10-ton dump truck and a 10-ton flatbed vehicle.

Therefore, the monitoring monitor 40 in the overall monitoring room 200 can identify the surface shape of the vehicle to be measured by reading from the storage unit the dimension data corresponding to the vehicle ID read by the vehicle information reading apparatus 50.

The first gate unit 20(1) and the second gate unit 20(2) include, as the various sensors 24, a distance sensor, a safety sensor, and a vehicle position sensor (not shown in detail in FIG. 1 and FIG. 2).

The vehicle position sensor is a sensor for measuring the inclination of the vehicle 300, which is stationary at the vehicle stopper 31, with respect to the advancement direction of the vehicle 300. The inclination information measured by the vehicle position sensor is transmitted to the monitoring monitor 40 in the overall monitoring room 200 via the main control apparatus 10 via communication. The method of measuring the inclination may be performed by using a camera.

The monitoring monitor 40 is configured to generate, based on the dimension data and the inclination information acquired relating to the vehicle to be measured, movement path data for moving the radiation detector 22 so as to maintain a fixed distance from the surfaces of the vehicle 300, which is stationary at the vehicle stopper 31. The generated movement path data is transmitted to the control unit 21 in each of the gate units 20(1) and 20(2) via the main control apparatus 10.

The distance sensor is configured to quantitatively measure the distance from the vehicle surfaces so that the radiation detector 22 can maintain a position separated from the vehicle surface by a predetermined distance. The control unit 21 moves, based on the movement path data acquired from the monitoring monitor 40, the gate units 20(1) and 20(2), and controls, in accordance with those positions, the height and depth of the first detectors 25, the height, horizontal position, and angle of the second detector 26, and the height and horizontal position of the third detectors 27, by using the drive mechanism unit 23.

As a result, the control unit 21 can appropriately position the pair of first detectors 25, the second detector 26, and the pair of third detectors 27, in accordance with a relative position between the vehicle 300 and the gate units 20, and can implement continuous inspection without stopping the radiation detector 22. Through use of the pair of third detectors 27, the control unit 21 can inspect the contamination state of the inner-side side surfaces of the cargo bed, and eliminate blind spots in the measurement direction.

As a result of enabling continuous inspection, it is not necessary to perform identification processing of contaminated places that extend across a plurality of areas for which the related-art apparatus stopped and performed measurement, as it is said in Patent Literature 1. Further, the size of the contaminated places can be easily identified.

The control unit 21 is also capable of preventing in advance the radiation detector 22 from hitting the vehicle 300, for example, during continuous inspection by reading a signal from the safety sensor.

[2] Regarding Faster Speed and Improvement in Reliability of Inspection Result Through Parallel Operation of Two Gate Units The vehicle gate monitor according to the first embodiment not only enables continuous inspection, as described in detail in [1] but also achieves faster speed through parallel operation of the two gate units 20(1) and 20(2).

The use of the two gate units 20 enables a redundant configuration in which inspection can be continued with one gate unit when one of the gate units 20 fails, although the inspection does take time. When there is sufficient time for the measurement, the same function as with two gate units can be implemented by using just one gate unit.

[3] Regarding Improvement in Inspection Accuracy Based on Desired Inspection Mode The vehicle gate monitor according to the first embodiment includes a plurality of inspection modes, for example, a mode for arbitrarily selecting a sensitivity and accuracy of surface contamination measurement by selecting an arbitrary inspection speed and detector position at an arbitrary gap from the vehicle surfaces. In other words, a desired inspection mode can be selected for the sensitivity and accuracy of surface contamination measurement.

Figure 6:
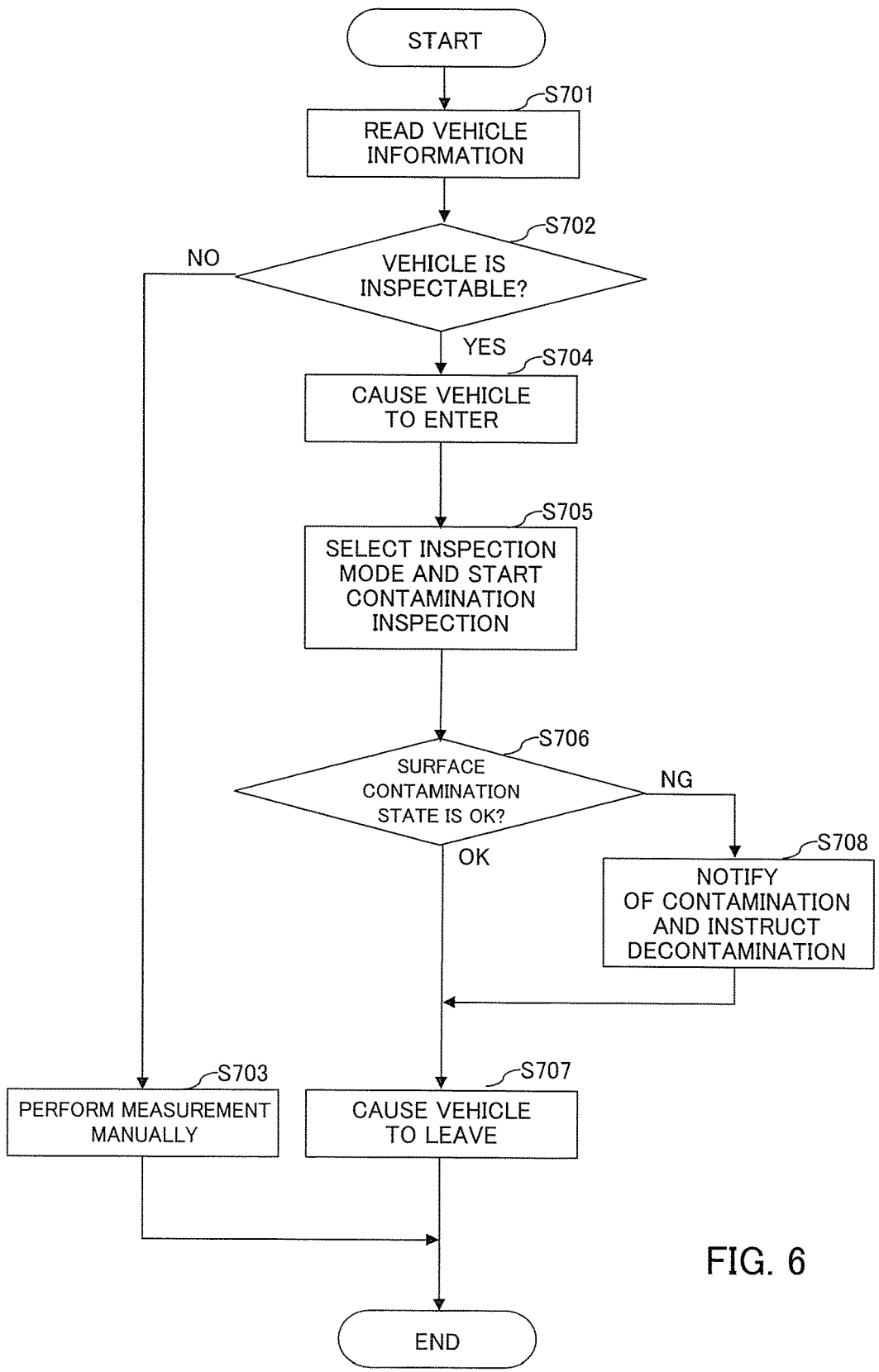
FIG. 6 is a flowchart for illustrating a series of processes relating to detection processing of a radiation level by the vehicle gate monitor according to the first embodiment of the present invention.

FIG. 6 is a flowchart for illustrating a series of processes relating to detection processing of a radiation level by the vehicle gate monitor according to the first embodiment of the present invention. First, in Step S701, the monitoring monitor 40 reads the ID of the vehicle 300 to be measured, which is acquired via communication from the vehicle information reading apparatus 50.

Next, the monitoring monitor 40 judges, based on the read ID, whether or not the vehicle 300 to be measured is an inspectable vehicle for which dimension data has been registered in advance. When it is judged that the vehicle 300 is not an inspectable vehicle, the monitoring monitor 40 advances the processing to Step S703, notifies that it is necessary to manually measure the radiation level, and ends the series of processes.

On the other hand, when it is judged that the vehicle is inspectable, the monitoring monitor 40 advances the processing to Step S704, causes the vehicle 300 to enter the measurement room 100 by issuing a notification for guiding the vehicle 300 to the measurement room 100, and causes the vehicle 300 to stop at the position of the vehicle stopper 31. The monitoring monitor 40 then reads an inclination amount of the vehicle 300 in the vehicle length direction by the vehicle position sensor.

In Step S705, the monitoring monitor 40 transmits movement path data generated by the monitoring monitor 40 to the first gate unit 20(1) and the second gate unit 20(2), and issues an instruction for the radiation level of the vehicle 300 to be measured. As an example of a desired inspection mode in Step S705, one of the two types of inspection modes described later, namely, high-speed inspection and high-accuracy inspection, may be selected.

When a high-speed inspection is to be executed in Step S705, for example, the first gate unit 20(1) and the second gate unit 20(2) execute continuous inspection while moving the radiation detector 22 at a speed and a position from the vehicle surfaces at which surface contamination of 40 $Bq/cm^2$ or more can be reliably measured. When a high-accuracy inspection is to be executed, for example, the first gate unit 20(1) and the second gate unit 20(2) execute continuous inspection while moving the radiation detector 22 at a closer position and at a lower speed than in the high-speed inspection mode at a sensitivity and accuracy at which surface contamination of 4 Bq/cm² or more can be measured.

Next, in Step S706, the monitoring monitor 40 receives the inspection result from the first gate unit 20(1) and the second gate unit 20(2) via the main control apparatus 10. When it is judged that the surface contamination state is OK, the monitoring monitor 40 advances the processing to Step S707, issues a notification for the vehicle 300 to be guided out of the measurement room 100, and ends the series of processes.

On the other hand, when it is judged in Step S706 based on the received inspection result that the surface contamination state is not OK, the monitoring monitor 40 advances the processing to Step S708, displays the contaminated places on the monitoring monitor 40, and issues a notification regarding the contamination and a notification urging decontamination by using the speaker 32 and the guidance display device 33. Then, the monitoring monitor 40 advances the processing to Step S707, issues a notification for the vehicle 300 to be guided out of the measurement room 100, and ends the series of processes.

In this way, the entire surface can be inspected and the contamination state be judged quickly and accurately by selecting the desired inspection mode that is appropriate at that time. As a result, a vehicle contaminated with the radioactive material equal to or more than a reference value can be reliably prevented from leaving the zone.

Figure 7:
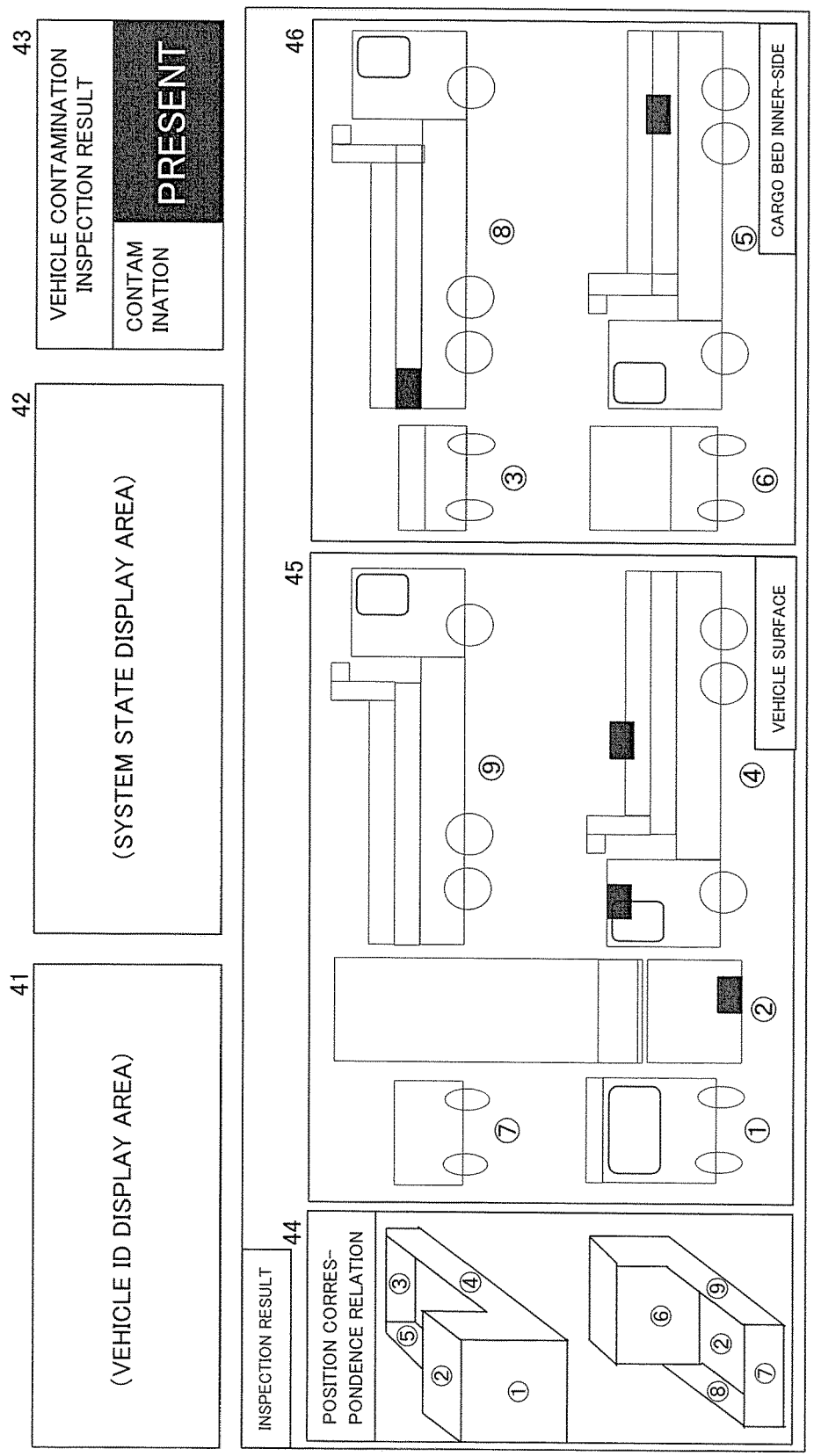
FIG. 7 is a display example of a radiation measurement result to be displayed on a monitoring monitor 40 in the first embodiment of the present invention.

FIG. 7 is a display example of a radiation measurement result to be displayed on the monitoring monitor 40 in the first embodiment of the present invention. Six pieces of information, namely, information on a first display area 41 to a sixth display area 46 such as those illustrated in FIG. 7, can be displayed on the monitoring monitor 40.

(1) First Display Area 41

The first display area 41 is an area for displaying the ID information on the vehicle 300 to be measured. Based on this display content, the operator and the monitoring monitor 40 can identify the vehicle 300 to be measured.

(2) Second Display Area 42

The second display area 42 is an area for displaying whether the communication state of each of the first gate unit 20(1), the second gate unit 20(2), and the main control apparatus 10 of the first embodiment of the present invention is normal or abnormal. Based on this display content, the operator can easily grasp the communication state of each site.

(3) Third Display Area 43

The third display area 43 is an area for displaying the presence/absence of contaminated places with a short side direction of the detectors at a fixed fine pitch resolution based on the result of a contamination state of the vehicle 300. Based on this display content, the operator and the monitoring monitor 40 can reliably grasp whether or not there are contaminated places in the vehicle as a whole.

(4) Fourth Display Area 44

The fourth display area 44 is an area for displaying the position of the measurement places by using a sequential serial number. Based on this display content, the operator can easily grasp a correspondence relation with the display content of the fifth display area 45 and the sixth display area 46, which are described below.

(5) Fifth Display Area 45

The fifth display area 45 is an area for graphically displaying the inspection results relating to the vehicle surfaces. Based on this display content, the operator can easily identify a portion which is judged as a contaminated place by the surface inspection, and can efficiently perform decontamination work. In the example illustrated in FIG. 7, in the fifth display area 45, the rectangular portions marked in black correspond to the portions detected as being contaminated places.

(6) Sixth Display Area 46

The sixth display area 46 is an area for graphically displaying the inspection results relating to the cargo bed inner side. Based on this display content, the operator can easily identify a portion which is judged as a contaminated place by the cargo bed inspection, and can efficiently perform decontamination work. In the example illustrated in FIG. 7, in the sixth display area 46, the rectangular portions marked in black correspond to the portions detected as being contaminated places.

In the specific example illustrated in FIG. 7, in the fourth area 44, front and rear perspective views of the vehicle to be inspected are displayed, and a sequential serial number of the position of the measurement places is superimposed and displayed thereon. In the fifth display area 45 and the sixth display area 46, the vehicle to be inspected is displayed as an orthographic projection view (or a third angle projection view), and the contaminated places based on the inspection results are superimposed and displayed thereon.

The perspective views and the orthographic projection views can be associated with the vehicle ID and stored in advance together with the dimension data in the storage unit of the monitoring monitor 40. Therefore, the monitoring monitor 40 can read from the storage unit the perspective views and the orthographic projection views corresponding to the vehicle ID information read by the vehicle information reading apparatus, display the perspective views and the orthographic projection views in the respective display area, and superimpose and display the contaminated places thereon based on the inspection results.

As a result, the operator can quickly identify the contaminated places by looking at the display content of the fourth display area 44, the fifth display area 45, and the sixth display area 46.

The orthographic projection views displayed in the fifth display area 45 and the sixth display area 46 are two-dimensional representations, for example, a front view, a top view, and a side view, but orthographic projection views can also be displayed in the fifth display area 45 and the sixth display area 46 by using three-dimensional representations viewed from a plurality of perspectives.

In this way, according to the first embodiment, as a result of increased hardware performance of the radiation detectors and of special measures in the control method performed based on a drive mechanism and software processing, the surfaces and the cargo bed of a vehicle can be quickly and accurately inspected, and contaminated places can be identified while continuously moving the detectors.

The invention claimed is:

1. A vehicle gate monitor, comprising a gate unit, the gate unit comprising:
   a gate comprising a pair of vertical beams and a horizontal beam for connecting upper end portions of the pair of vertical beams;
   a detector group, which is arranged on the gate, and is configured to quantitatively measure a contamination state of a vehicle to be measured; and
   a control unit configured to detect, by causing the gate to move with respect to the vehicle, which is stationary, radiation levels of a front surface, a rear surface, both side surfaces, an upper surface, and a cargo bed surface of the vehicle via the detector group to identify a contaminated place based on a detection result, the detector group comprising:
- a pair of first detectors, which is arranged on the pair of vertical beams, and is configured to measure the radiation levels of both the side surfaces of the vehicle as a surface to be measured;
- a pair of third detectors, which is mounted on the horizontal beam in a manner that allows the pair of third detectors to vertically and horizontally move in accordance with a cargo bed shape of the vehicle, and is configured to measure a radiation level of an inner-side side surface of the cargo bed surface of the vehicle as the surface to be measured; and
- a second detector, which is mounted on the horizontal beam in a manner that allows the second detector to vertically and horizontally move together with the pair of third detectors and to rotatably move so as to face the surface to be measured, and is configured to measure the radiation levels of the front surface, the rear surface, the upper surface, and a surface of the cargo bed surface other than the inner-side side surface of the vehicle as the surface to be measured, the vehicle gate monitor further comprising a distance sensor to be mounted on the gate, the distance sensor being configured to measure a distance from the surface to be measured of the vehicle so that the detector group is capable of maintaining a position that is separated by a predetermined distance from the surface to be measured, the control unit being configured to:
- acquire, from outside, movement path data defined based on known dimension data for identifying a position of the surface to be measured of the vehicle; and
- control a vertical position and a depth position of the pair of first detectors, a vertical position, a horizontal position, and a rotation position of the second detector, and a vertical position and a horizontal position of the pair of third detectors while moving the gate from the front surface of the vehicle toward the rear surface of the vehicle and correcting the movement path data in accordance with a measurement result obtained from the distance sensor, to thereby continuously move the pair of first detectors, the second detector, and the pair of third detectors while maintaining the position that is separated by a predetermined distance from the surface to be measured of the vehicle to identify a contaminated place based on a detection result obtained via the detector group.

2. A vehicle gate monitor according to claim 1,
wherein the gate unit comprises a first gate unit arranged closer to the front surface of the stationary vehicle, and a second gate unit arranged closer to the rear surface of the vehicle,
wherein the vehicle gate monitor further comprises a monitoring monitor configured to control in an integrated manner a first control unit, which is a control unit in the first gate unit, and a second control unit, which is a control unit in the second gate unit,
wherein the monitoring monitor is configured to:
- divide the movement path data into first movement path data for performing a measurement by the first gate unit arranged closer to the front surface of the vehicle, and second movement path data for performing a measurement by the second gate unit arranged closer to the rear surface of the vehicle;
- transmit the first movement path data to the first gate unit and the second movement path data to the second gate unit;
- output a radiation level detection command to each of the first control unit and the second control unit;
- combine a first detection result received from the first control unit as a response to the detection command and a second detection result received from the second control unit as a response to the detection command; and
- identify a contaminated place in the vehicle.

3. A vehicle gate monitor according to claim 2, wherein the monitoring monitor comprises a notification function for displaying a contaminated place on a screen and urging decontamination when data indicating the contaminated place is included in any one or both of the first detection result and the second detection result.

4. A vehicle gate monitor according to claim 2, further comprising:
- a vehicle information reading apparatus configured to read ID information on the vehicle to be measured; and
- a storage unit configured to store in advance dimension data of a vehicle associated with the ID information,
wherein the monitoring monitor is configured to acquire the dimension data of the vehicle to be measured and to generate the first movement path data and the second movement path data by extracting from the storage unit the dimension data corresponding to the ID information read by the vehicle information reading apparatus.

5. A vehicle gate monitor according to claim 3, further comprising:
- a vehicle information reading apparatus configured to read ID information on the vehicle to be measured; and
- a storage unit configured to store in advance an orthographic projection view of a vehicle associated with the ID information,
wherein the monitoring monitor is configured to visually identify a position of the contaminated place by extracting from the storage unit the orthographic projection view of the vehicle corresponding to the ID information read by the vehicle information reading apparatus, displaying the extracted orthographic projection view on the screen, and superimposing and displaying the contaminated place on the orthographic projection view.

6. A vehicle gate monitor according to claim 3, further comprising:
- a vehicle information reading apparatus configured to read ID information on the vehicle to be measured; and
- a storage unit configured to store in advance a diagram of a three-dimensional representation of a vehicle, which is associated with the ID information, viewed from a plurality of perspectives,
wherein the monitoring monitor is configured to visually identify a position of the contaminated place by extracting from the storage unit the diagram of the three-dimensional representation of the vehicle corresponding to the ID information read by the vehicle information reading apparatus, displaying the extracted diagram of the three-dimensional representation on the screen, and superimposing and displaying the contaminated place on the diagram of the three-dimensional representation.

7. A vehicle gate monitor according to claim 2, further comprising:
- a vehicle stopper, which is arranged in a raisable and lowerable manner, and is configured to stop the vehicle at a position suitable for measuring the contamination state by moving the gate; and a notification device configured to issue a notification for guiding the vehicle to the suitable position, stopping the vehicle at the position of the vehicle stopper, and causing the vehicle to leave after measurement, wherein the monitoring monitor is configured to:

before measurement of the contamination state, raise the vehicle stopper, and guide and stop the vehicle at the suitable position by issuing a notification based on audio output and display output from the notification device; and after measurement of the contamination state, lower the vehicle stopper, and cause the vehicle to leave a location for measurement of the contamination state by the gate by issuing a notification based on audio output and display output from the notification device.

* * * * *